US011299114B1

(12) United States Patent
Dhainaut et al.

(10) Patent No.: US 11,299,114 B1
(45) Date of Patent: Apr. 12, 2022

(54) MOTOR VEHICLE ELECTRICAL ARCHITECTURE COMPRISING A DISTRIBUTION BOX OF AT LEAST ONE SWITCHED ELECTRICAL SUPPLY, METHOD FOR THE USE THEREOF, AND MOTOR VEHICLE INCORPORATING SAME

(71) Applicant: PSA AUTOMOBILES SA, Poissy (FR)

(72) Inventors: Jean Marc Dhainaut, Paris (FR); Cyril Rapin, St. Aout (FR)

(73) Assignee: PSA AUTOMOBILES SA, Poissy (FR)

( * ) Notice: Subject to any disclaimer, the term of this patent is extended or adjusted under 35 U.S.C. 154(b) by 0 days.

(21) Appl. No.: 17/439,217

(22) PCT Filed: Mar. 4, 2020

(86) PCT No.: PCT/FR2020/050425
§ 371 (c)(1),
(2) Date: Sep. 14, 2021

(87) PCT Pub. No.: WO2020/208322
PCT Pub. Date: Oct. 15, 2020

(30) Foreign Application Priority Data

Apr. 9, 2019 (FR) ...................................... 1903767

(51) Int. Cl.
*B60R 16/03* (2006.01)
(52) U.S. Cl.
CPC .................................... *B60R 16/03* (2013.01)
(58) Field of Classification Search
None
See application file for complete search history.

(56) References Cited

U.S. PATENT DOCUMENTS 4,763,220 A * 8/1988 Belbel ................ H03K 17/0824
361/100
6,055,902 A * 5/2000 Harrop .................. B30B 9/3007
100/229 A (Continued)

FOREIGN PATENT DOCUMENTS

DE 10162522 A1 7/2002
GB 2537197 A 10/2016

OTHER PUBLICATIONS

International Search Report for PCT/FR2020/050425 dated Jul. 28, 2020.
Written Opinion for PCT/FR2020/050425 dated Jul. 28, 2020.

*Primary Examiner* — Rexford N Barnie
*Assistant Examiner* — Terrence R Willoughby
(74) *Attorney, Agent, or Firm* — Sandberg Phoenix & von Gontard, P C.

(57) ABSTRACT

Disclosed is a motor vehicle electrical architecture comprising a supply switched by a relay. The architecture comprises a controllable resistive load (60) ensuring a consumption of, for example at least 500 mA, connected at the output of said relay and controlled by a computer (30) according to a control law. The controlled resistive load is only activated when the speed of said vehicle is zero, or very close to 0. This makes it possible to limit the duration of supply of the resistive load, and consequently the heat dissipation, electrical consumption and $CO_2$ emissions over the duration of travel, while ensuring consumption at the switched supply voltage in the phases where the driver is likely to cut the ignition and thus cause the relay to open.

10 Claims, 5 Drawing Sheets

(56) References Cited

U.S. PATENT DOCUMENTS

| | | | |
|---|---|---|---|
| 6,356,424 B1* | 3/2002 | Myong | H02H 3/085 |
| | | | 361/93.7 |
| 2018/0105059 A1 | 4/2018 | Namou et al. | |
| 2021/0006235 A1* | 1/2021 | Karinca | H03H 11/126 |
| 2021/0027962 A1* | 1/2021 | Okuyama | H05B 47/10 |
| 2021/0086710 A1* | 3/2021 | Asano | H02G 3/081 |

* cited by examiner

[Fig. 1]
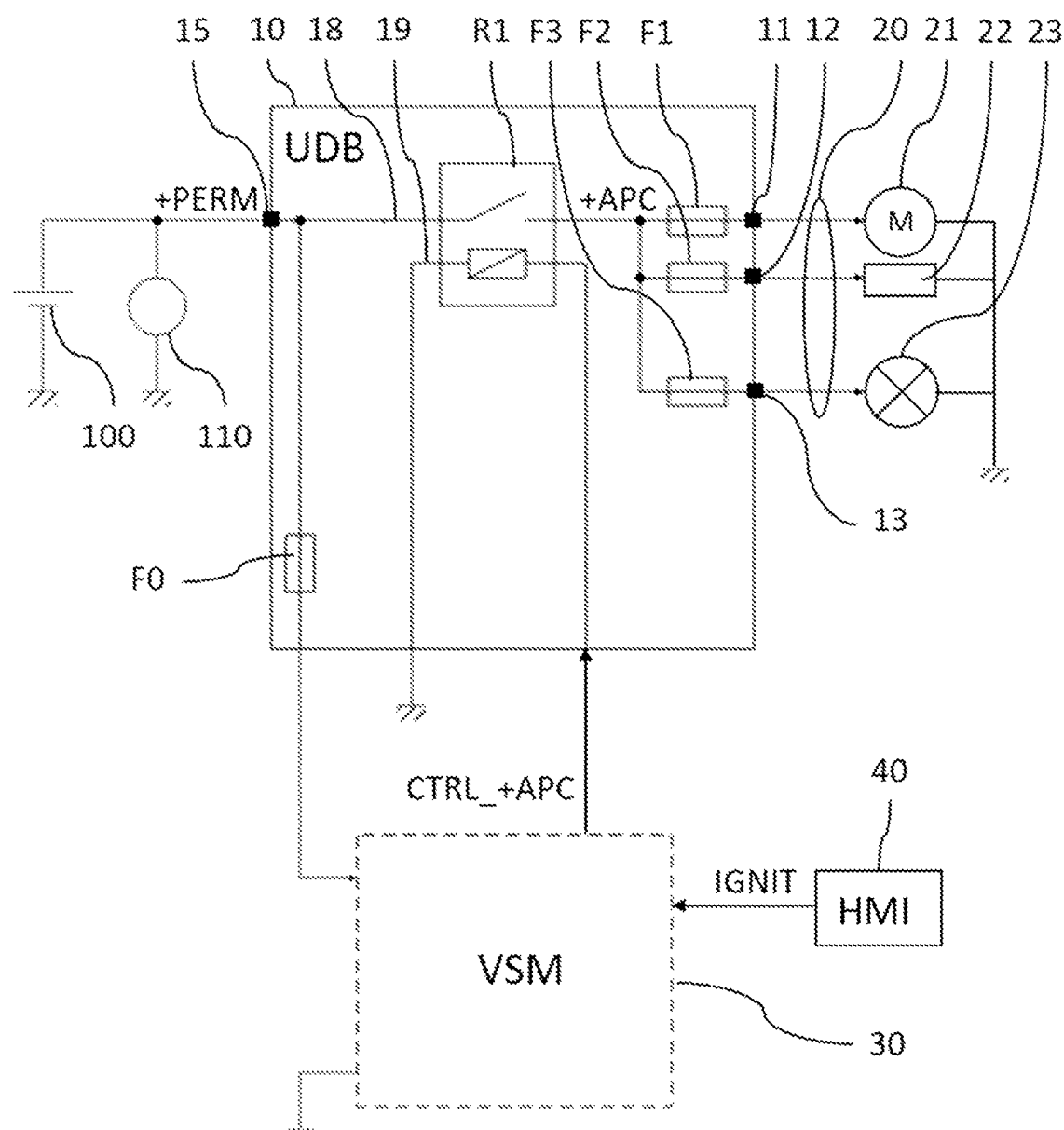
Prior Art

[Fig. 2]
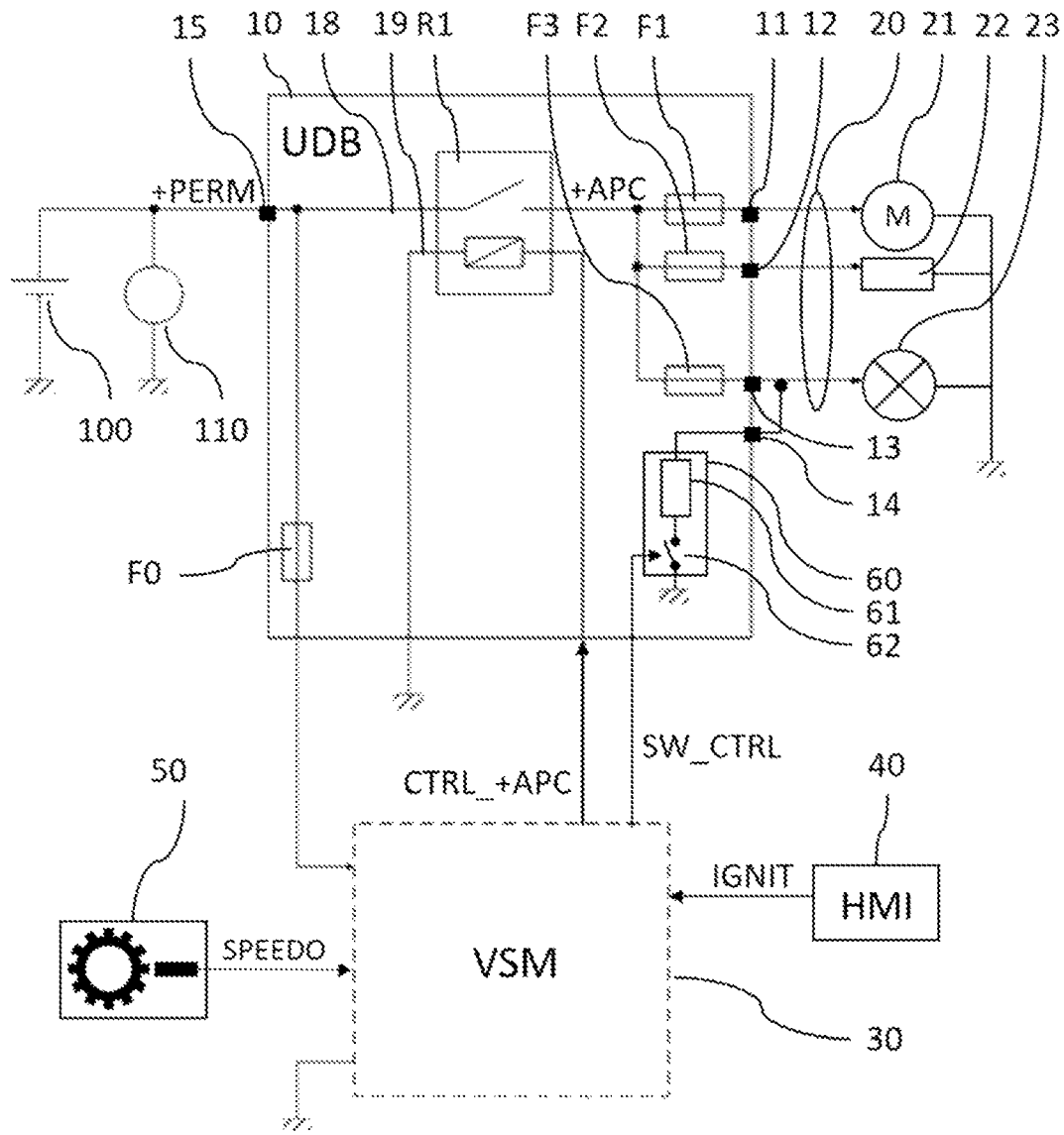

[Fig. 3]
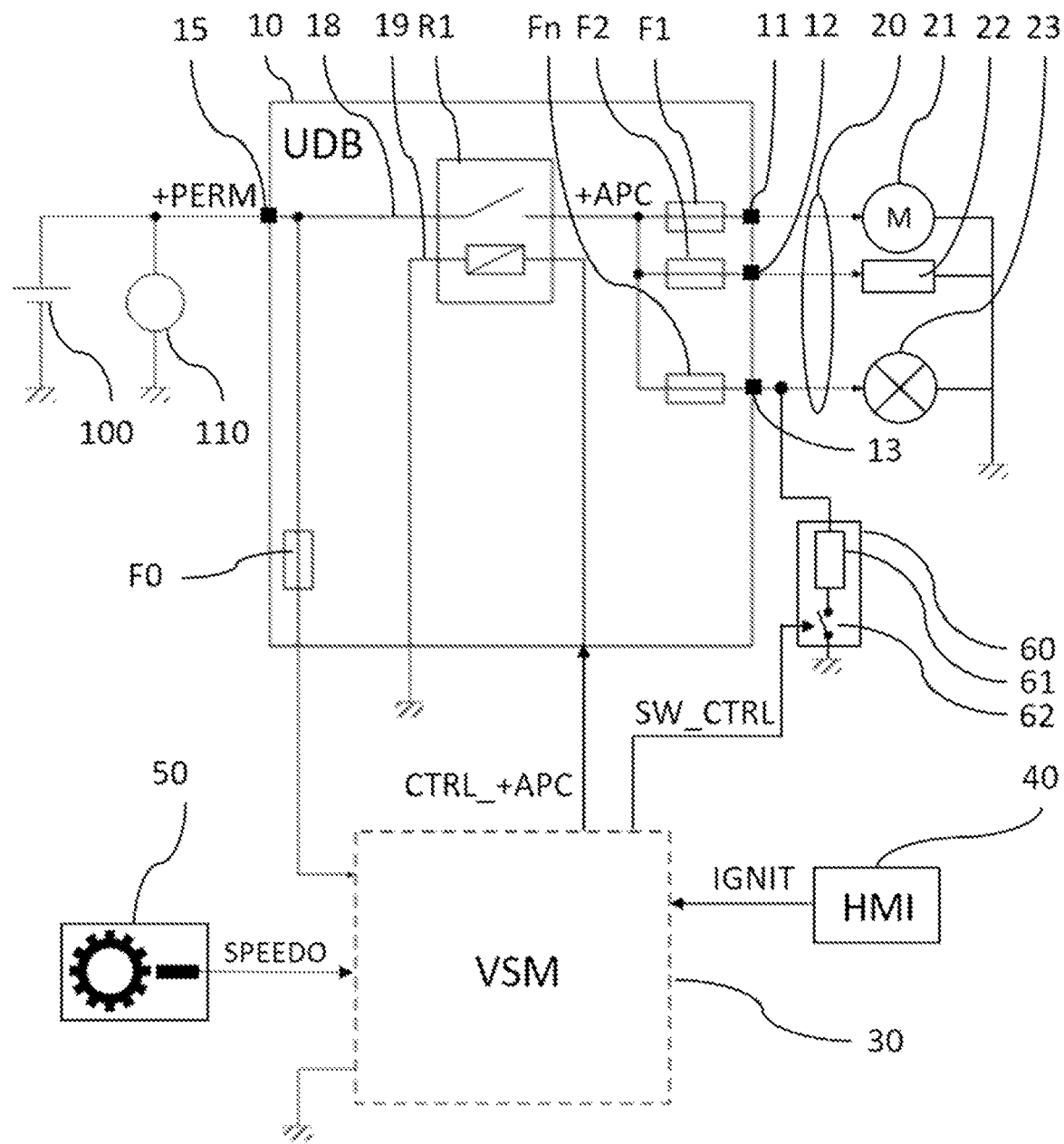

[Fig. 4a]
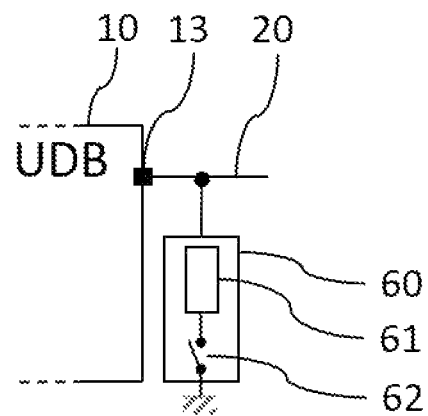
[Fig. 4b]
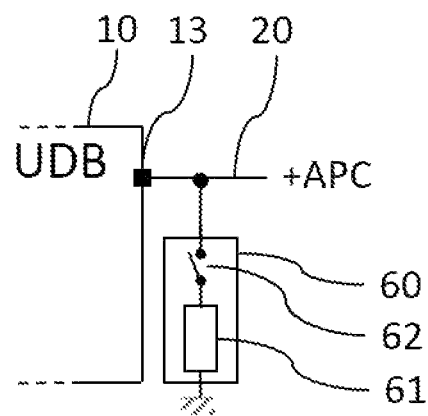

[Fig. 5]
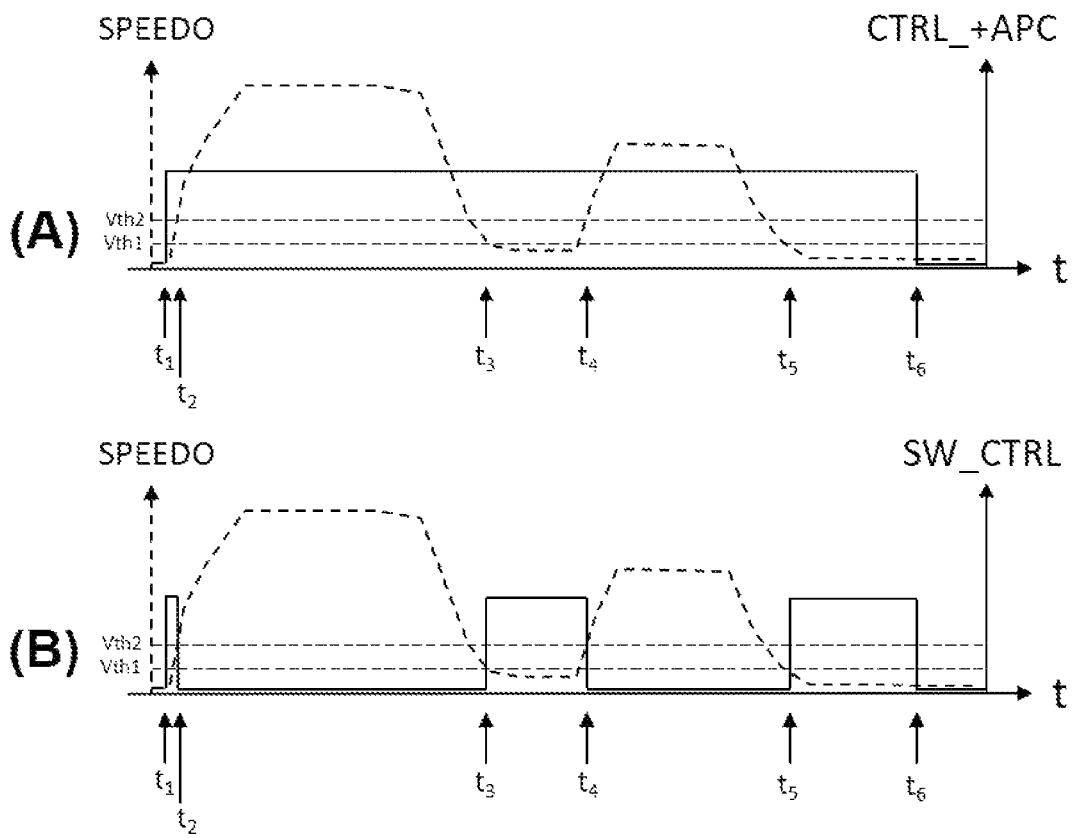

MOTOR VEHICLE ELECTRICAL ARCHITECTURE COMPRISING A DISTRIBUTION BOX OF AT LEAST ONE SWITCHED ELECTRICAL SUPPLY, METHOD FOR THE USE THEREOF, AND MOTOR VEHICLE INCORPORATING SAME

CROSS-REFERENCE TO RELATED APPLICATIONS

This application is the US National Stage under 35 USC § 371 of International Application No. PCT/FR2020/050425, filed 4 Mar. 2020 which claims priority to French Application No. 1903767 filed 9 Apr. 2019, both of which are incorporated herein by reference.

TECHNICAL FIELD

The present invention relates generally to motor vehicle electrical architectures, and more particularly to the distribution of switched electrical supplies.

It concerns such a motor vehicle electrical architecture comprising a distribution box of at least one switched electrical supply, a method for the use thereof, and a motor vehicle incorporating it.

BACKGROUND

Motor vehicles comprise different types of electrical power supplies, permanent and switched, generally protected by fuses. In the automotive field, "electrical power supply" refers to a source of electric current at a determined supply voltage, such as an accumulation battery or a DC/DC voltage converter.

In the context of this disclosure, switching an electrical power supply refers to establishing or interrupting one or more electrical connections between said electrical power supply and one or more devices consuming electric current. These devices can be present on board the vehicle, or can be supplied with electric current via the vehicle, such as for example a diagnostic tool which can be connected to the vehicle via a diagnostic socket by being supplied from a power supply source of the vehicle.

Switched power supplies typically comprise the following power supplies:
the +ACC (or "+Accessories"), present when the ignition key is in the "Accessories" position, this power supply generally being cut off when the vehicle starter is activated;
the +APC (or "+After-Contact"), present when the ignition key is in the "On" position; and
possibly other switched power supplies that are specific, for example, to the computer power supply (such as the switched power supply for the engine control computer, or the power supply for multiplexed computers such as the +CAN for vehicles of the PSA Automobiles SA group, etc.).

Switched power supplies, including the +ACC and the +APC, can be switched in different ways:
either directly by the steering lock (also called "Neiman™" locks in the jargon of those skilled in the art) in the case of a "strong current" lock, which is a solution used more on old model vehicles or on more recent model, but entry-level vehicles,
or via switches (relays or transistors) controlled by the central computer of the vehicle, namely the BSI (for "Built-in Systems Interface"), also called VSM (for "Vehicle Supervisor Module") or BCM (for "Body Control Module") in common terminology.

The second solution above is more commonly used nowadays.

Switching by switches can be done by using:
information from a "low current" anti-theft device; or
information provided by a push-start ignition ("Start/Stop" button), generally used on vehicles equipped with a hands-free access and ignition system. In the case of a push-start ignition, because the latter does not have a stable "On" position, using switches (such as relays or transistors) controlled by a computer allows voltage transitions (generated by pressing the push button) to be transformed into stable electrical states.

For other switched power supplies (such as for example the switched power supply for the engine control computer, or the power supply for multiplexed computers, for example the aforementioned +CAN, etc.), controlled switches (relays or transistors) are generally used, because the control of these switches does not correspond directly to the position of a control human-machine interface (HMI), such as the key for the steering lock, pushbuttons, controls, etc.

In addition, switched power supplies, in particular +ACC and +APC, supply several current-consuming devices in the vehicle. Hereinafter, these devices are more simply referred to as "current consumers," or even more simply as "consumers," for short. Switched power supplies generally use a relay, or the like, associated with several downstream fuses, the function of which is to protect consumers in the event of an electrical fault such as a short-circuit to ground, for example.

These switches and these fuses are generally mounted in an electrical distribution box, also called a "relay fuse box" in the jargon of those skilled in the art. Such a box comprises at least one input coupled to the electrical power supply, at least one output coupled to one or more consumers via an external wiring harness, as well as at least one power switch (generally a relay, but which could also be a power transistor or a thyristor) arranged in series between said input and said output of the box and controlled to switch the power supply according to the different operational configurations of the vehicle.

Certain switched power supplies, in particular the +APC, supply a variable number of consumers, depending on the level in the range and the options of the vehicle. It follows that the switch can pass a current of variable intensity based on the consumers that are present and activated.

In addition, certain consumers may have variable current consumption depending on the phase of life or the operating phase of the vehicle, this consumption possibly being zero when the function is not used. For example, the headlight elevation adjustment thumbwheel and motors only draw power when the elevation adjustment is changed.

According to another example, the diagnostic socket of the vehicle draws power only when a diagnostic tool is connected to the socket, etc.

This results in a great variability in the current consumed on the relay associated with the +APC power supply (also more simply referred to as "+APC relay" hereinafter, for short). This current can vary from a few milliamperes (mA) on an entry-level vehicle, without activation of a function, to around thirty or forty amperes (A) on a high-end vehicle with its functions activated.

For high currents of a few tens of amperes, for example, and with several consumers being supplied, technology based on relays and fuses is the most economically competitive compared to alternative solutions based on power transistors. Thus, for example, on the new NEA R1 electronic electrical architecture from PSA, the +APC relay is a removable relay mounted on the UDB (for "Under hood Distribution Box"), which is a "relay fuse box" installed in the engine compartment of the vehicle.

But the relays are not compatible with excessively low currents. In particular, a minimum current of approximately 500 mA is necessary when opening the relay (i.e. when the power supply is cut off) in order to create an electric arc making it possible to avoid fouling the contact point of the relay due to passive oxidation on the surface thereof.

A possible solution to guarantee the minimum current would be to add a resistor on the output of the +APC relay, either directly in the UDB, or in the wiring harness between the output of the box and the consumer(s).

However, such a solution comprises some or more of the following drawbacks:
- high power sizing of the resistive load to withstand the exceptional voltages (18 V, 24 V) that the architecture must be able to withstand according to the usual specifications of automobile manufacturers. To ensure a minimum current of 500 mA at 12 V, the resistance must be 24Ω. Under an average voltage of the on-board network of approximately 14 V, which can be observed during charging by the alternator, this already represents a dissipated power of 8.17 W. But under an exceptional voltage of 18 V that the architecture must be able to withstand, this represents a dissipated power of 13.5 W, and under an exceptional voltage of 24 V, this represents a dissipated power of 24 W, which is considerable;
- adding such additional power dissipation in an environment (i.e. the engine compartment) that is already very hot, and above all confined, which is already the site of strong heat dissipation, is a major difficulty, especially when a resistor is being integrated in the UDB;
- an impact on the development time of the UDB when the resistor is integrated directly into the UDB, for example on the printed circuit thereof;
- an impact on the diversity of the versions of the UDB to be used depending on the vehicle model or an additional cost for all types of UDB in the case where the resistor is integrated directly into the UDB, for example on the printed circuit thereof; and finally,
- an impact on costs, in particular on the cost of the wiring harnesses, and more particularly in the case of a resistor integrated into the harness.

SUMMARY

An alternative to the solutions known or envisioned in the prior art is disclosed which makes it possible to overcome all or part of the aforementioned drawbacks.

More particularly, a first aspect relates to an electrical architecture of a motor vehicle, comprising:
- an electrical ground and a DC voltage source delivering at least one supply voltage;
- at least one current-consuming device;
- an electrical distribution box with at least one supply rail coupled to an input of the box to receive the supply voltage and a ground rail coupled to the ground, at least one output, and at least one relay arranged in series between the supply rail and the output of the box and adapted to switch the supply voltage to the output terminal;
- a wiring harness, arranged between the output of the electrical distribution box and the current consuming device in order to supply said device electrically with the switched supply voltage; and
- at least one computer.

The architecture further comprises a controllable resistive load electrically connected in parallel between the output of the electrical distribution box, on the one hand, and the positive supply rail or the ground, on the other hand, said controllable resistive load comprising at least one switch in series with at least one resistor, said switch being adapted to be controlled by the computer according to a control law that is adapted to cause the switch to close for a vehicle speed below a first determined speed threshold, making it possible to ensure current consumption in the relay under the supply voltage that is greater than a determined current threshold, on the one hand, and to cause the switch to open for a vehicle speed greater than a second determined speed threshold, higher than said first speed threshold, on the other hand.

Knowing that, in the envisioned uses in which the considered supply voltage is for example the +APC, the relay can in principle only be opened when the vehicle is stationary and the user acts on the Neiman™ lock or on the "Start/Stop" button to cut the vehicle's electrical supply (i.e. to switch the +APC supply so that it is no longer delivered to current consumers), implementing embodiments of the electrical architecture allows a minimum current to be ensured in the +APC relay at least at the time of its opening. This minimum current, which is for example at least 500 mA and which is determined in particular by the choice of the value of the resistance in series with the switch), has the effect of producing a cleaning of the relay contact by the generated electric arc. This results in better longevity of the relay, in particular on entry-level vehicles, which do not necessarily have sufficient minimum consumption on the +APC relay.

Advantageously, those skilled in the art will appreciate that the control of the controlled resistive load is non-permanent. For example, it only takes place in situations where the vehicle is stopped (i.e. when the vehicle speed is zero or almost zero), in which only an interruption of the +APC supply by the driver is likely to occur. This makes it possible to limit the power dissipated in the controlled load, and the heating induced at the relay fuse box when this load is integrated into said relay fuse box. More particularly, this makes it possible to minimize the average power dissipated during the journey in order to avoid excessive heating of the UDB, which is located in the engine compartment with a very high ambient temperature (up to 110° C.), and which already has a dissipation of several tens of watts.

This also makes it possible to minimize the electrical overconsumption and the $CO_2$ emissions generated by the addition of the resistive load.

The fact that the second vehicle speed threshold is greater than the first vehicle speed threshold creates a hysteresis that prevents switching too close to the switch of the controlled load, and therefore instability of the system.

In some embodiments, the value of the resistance of the controlled load is such that, also taking into account the value of the concerned switched supply voltage, controlling the controlled resistive load allows a minimum consumption of 500 mA to be ensured on the relay when said relay opens. This value ensures self-cleaning of the relay contact point by the electric arc that is produced when the relay opens.

In summary, the proposed solution comprises adding, on vehicles that do not have sufficient consumption on a relay, and preferably only on these vehicles, a controllable resistive load ensuring a consumption of for example at least 500 mA, connected to the output of said relay and controlled by a computer according to a control law both allowing a minimum consumption to be ensured when the relay is opened and allowing the average power dissipated during the period of travel of the vehicle to be minimized.

Embodiments taken alone or in combination further provide that:

- the controllable resistive load can be arranged in a removable relay box, for example a box having an "Ultramicro," "Micro," "Mini" or "Power" relay type format, which is suitable for being installed in the electrical distribution box; this makes it possible to limit the installation and assembly problems, to be able to easily decline the presence of the resistive load in order to avoid installing it on vehicles which do not need it, while avoiding creating diversity on the "bare" UDB, i.e. the UDB not yet equipped with its relay boxes; also, this makes it possible not to modify the technical definition (plastic box, connectors and printed circuit) of the UDB;
- the controllable resistive load may be arranged outside the electrical distribution box, for example in the wiring harness;
- the electrical architecture can further comprise a temperature sensor arranged to sense the temperature at the controllable resistive load, and the computer can be adapted to implement a thermal protection function in order to inhibit the switch closing command when the temperature at the controllable resistive load is greater than a determined threshold; this makes it possible to protect the controllable resistive load and the UDB in the event of overheating (for example if the activation of said load could take place at a time when the environment is at the maximum tolerable temperature); this also makes it possible to dimension the resistive load and its cooling system to only what is required;
- the computer can be adapted to implement a diagnostic function associated with the controllable resistive load; this makes it possible to check that the controllable resistive load is indeed present;
- the electrical architecture can further comprise a current sensor in series with the relay of the electrical distribution box and adapted to produce information relative to the current actually flowing in said relay, and the strategy for controlling the controlled resistive load can be a function of said information;
- the control of the switch of the controllable resistive load can be controlled by a periodic pulse-width modulated signal;
- the computer can be adapted to compare the value of the switched supply voltage with a determined threshold, for example 16 V, and to force the deactivation of the controllable resistive load if said threshold is exceeded; this makes it possible to limit the power sizing of the resistive load and the thermal impact on the UDB by ensuring load shedding during exceptional voltages (18 V or 24 V, for example). Thus, by load shedding for a voltage greater than 16 V, for example, the dissipated power can be reduced to 10.67 W instead of 24 W for an exceptional voltage withstand of 24 V.

A second aspect relates to a method of using an electrical architecture according to the first aspect above in which the controllable resistive load is activated and is adapted to ensure the circulation of a minimum electric current in the relay, for example a current equal to approximately 500 mA, when the speed of the vehicle is less than or equal to a first speed threshold, for example equal to approximately 0 km/h, and in which the controllable resistive load is deactivated when the speed of the vehicle is greater than a second speed threshold, strictly greater than the first speed threshold, and for example equal to approximately 5 km/h.

A third aspect relates to a motor vehicle comprising an electrical architecture according to the first aspect.

BRIEF DESCRIPTION OF THE FIGURES

Other features and advantages of the electrical architecture will become apparent on reading the description which follows. This is purely illustrative and should be read in conjunction with the accompanying drawings, in which:

FIG. 1 is a functional diagram of an example of an electrical architecture according to the prior art;

FIG. 2 is a diagram illustrating a first embodiment of the electrical architecture;

FIG. 3 is a diagram illustrating a second embodiment of the the electrical architecture;

FIG. 4a is a diagram illustrating a first connection mode, or "low side" connection mode, of the controllable load of the embodiments of FIGS. 2 and 3;

FIG. 4b is a diagram illustrating a second connection mode, or "high side" connection mode, of the controllable load of the embodiments of FIGS. 2 and 3; and FIG. 5 is a set of two chronograms jointly illustrating the use of the electrical architecture according to embodiments of FIGS. 2 and 3.

DESCRIPTION OF THE EMBODIMENTS

In the description of embodiments which will follow and in the figures of the accompanying drawings, the same elements or similar elements bear the same reference numerals in the drawings.

The invention is in the field of the electrical distribution of land vehicles with internal combustion engines (gasoline, diesel, LPG, CNG, ethanol, etc.), or of electric, hybrid, plug-in hybrid vehicles, or even battery-powered vehicles, with an on-board network in 6 Volts (V), 12 V, 24 V or 48 V.

These may be passenger cars for individuals, light commercial vehicles, camper vans, ambulances, fire engines, heavy trucks, coaches, buses, construction vehicles, agricultural machinery, military vehicles, light quadricycles, motorcycles, sidecars, etc. This list is not exhaustive.

In the remainder of the document, the application considered is intended for private vehicles or light commercial vehicles, with a 12 V on-board network. However, those skilled in the art will appreciate that embodiments can be extended to the other types of vehicles mentioned in the previous paragraph, with 6 V, 24 V or 48 V on-board networks, for example.

Referring to the diagram of FIG. 1, the conventional electrical architecture of a motor vehicle comprises an electrical ground and at least one DC voltage source 100 delivering a supply voltage, which is a positive DC voltage with respect to the ground. In the illustrated example, this voltage is +PERM (+permanent), which has a nominal value equal to 12 V. The DC voltage source 100 is for example an accumulation battery. The battery 100 is recharged by a generator such as an alternator or an alternator-starter 110, which comprises a current rectifier and an ad-hoc voltage regulator for this purpose. When the battery 100 is charged by the generator 110, the value of the +PERM voltage may increase to about 14 V. According to the applicable standards, the on-board network must withstand the application of a supply voltage equal to 24 V during tests, in particular in order to guarantee the robustness of the electrical architecture to improper handling by an operator who would mistakenly connect a truck battery, rated at 24 V, instead of the intended vehicle battery, rated at 12 V. Instead of a battery, the generator 110 can, for example, be a DC-DC converter which generates the +PERM supply voltage from the voltage of an electric vehicle battery whose nominal value is greater than 12 V, for example equal to 48 V, and which also serves to supply the electric traction motor(s) of the electric or hybrid vehicle.

The electrical architecture of the vehicle also comprises one or more current-consuming devices, such as an electric motor 21 (for example, a window motor, a wiper motor, a servo motor of an actuator for adjusting the headlight elevation, etc.), a lamp 23 (such as a front headlight, a front or rear position light, a turn signal, or a passenger compartment light bulb, etc.), and/or any electrical equipment 22 with a resistive component that is likely to consume electric current when activated.

The electrical architecture of the vehicle also comprises an electrical distribution box 10 (or fuse box) with at least one positive supply rail 18 coupled to an input 15 of the electrical distribution box so as to receive the +PERM supply voltage delivered by the voltage source 100 and a ground rail 19 coupled to the ground of the vehicle. The box 10 also comprises one or more output terminals, such as the terminals 11, 12 and 13.

The electrical distribution box 10 also comprises at least one relay, such as the relay R1, arranged in series between the supply rail 18 and output terminals such as the outputs 11, 12 and 13, through fuses F1, F2 and F3, respectively. The relay R1 is suitable for switching the +PERM supply voltage in order to generate the +APC (+after contact) voltage, which is then delivered to the output terminals 11, 12 and 13. In other words, the +APC voltage downstream of the relay R1 (the term "downstream" being considered here in relation to the direction of current flow from the voltage source 100 toward the ground) corresponds to the +PERM permanent supply voltage when relay R1 is closed, and is indeterminate when the relay R1 is open (high impedance state of the relay output). Those skilled in the art will appreciate that, when the relay R1 is closed, the +APC voltage is also said to be switched to the value of the +PERM permanent supply voltage.

The electrical architecture also comprises a wiring harness 20, comprising a number N of electrical wires, where N is an integer, each arranged between an output terminal of the electrical distribution box and a determined current consuming device, in order to supply electrical power to said device with the +APC supply voltage when it is switched by the relay R1. Thus, consumers 21, 22 and 23 are supplied by the +APC switched voltage, and are protected against possible over-voltages and short circuits by fuses F1, F2 and F3, respectively.

In summary, the output terminals 11, 12 and 13 of the electrical distribution (relay fuse) box 10 are adapted to deliver the +APC supply voltage to one or more current consuming devices of the vehicle 21, 22 and 23, respectively, through the relay R1 and through respective fuses F1, F2 and F3, respectively for supplying said current consuming devices.

The electrical architecture of the vehicle also comprises one or more computers, such as the computer 30 of the example shown in FIG. 2. In this example, the computer 30 is the passenger compartment central computer or VSM (for "Vehicle Supervisor Module"), also called BSI ("Built-in Systems Interface") at PSA Automobiles SA, or else BCM (for "Body Control Module") by other car manufacturers. In the illustrated example, the computer 30 is permanently supplied by the +PERM permanent supply voltage. To this end, the computer is connected, for example, to the supply rail 18 of the electrical distribution box 10, upstream of the relay R1 (the term "upstream" here again being considered in relation to the direction of current flow from the voltage source 100 toward the ground). However, this connection takes place through a fuse F0 of the box 10, in order to protect the computer against over-voltages and possible over-currents.

In the illustrated example, the architecture lastly has a Human-Machine Interface 40, which can comprise the Neiman™ lock or the "Start/Stop" button of the motor vehicle, or any similar device by which the user can trigger switching of the +APC. By actuating such a control device, in fact, the user of the vehicle triggers the transmission by the HMI 40 of an IGNIT signal, for example a binary signal that is active in the high state (binary state "1"), which is interpreted by the computer 30 as a control signal to allow the electrical consumers 21, 22 and 23 to be supplied with the +APC voltage. This is why, in response to the IGNIT signal, the computer 30 generates a CTRL_+APC signal that is applied to the control terminal of the relay R1 of the box 10, in order to cause the closing of the relay R1, and therefore the switching of the +APC voltage, which is then delivered to the outputs 11, 12 and 13 of the box 10.

In order to compensate for the insufficient current consumption on the +APC relay on certain vehicles, and in particular entry-level vehicles, which is a source of fouling of the contact point of the relay, a solution lies in adding a resistive load to force the flow of a minimum current in the relay R1. This load must be sized to ensure a minimum current of, for example, 500 mA in relay R1 in FIG. 1. However, a "simple" resistive load (that is to say, not switched), which would for example be directly connected to the harness 20, could certainly meet the need to have a minimum current in the +APC relay, but it would also have a significant impact on the cost of the beam and would increase electrical consumption and $CO_2$ emissions. Such a "simple" load would also have a non-negligible impact on heat dissipation, which is prohibitive in the case of direct integration on the printed circuit of the UDB.

This is why, according to embodiments, the resistive load is controlled, that is to say, it is non-permanent. This makes it possible to limit the dissipated power and the heating induced on the relay fuse box, as well as the associated electrical consumption and $CO_2$ emissions.

With particular reference to the embodiments shown in FIG. 2 and in FIG. 3, the proposed electrical architecture comprises a controllable resistive load 60. This load 60 is electrically connected in parallel between one of the output terminals of the electrical distribution box, on the one hand, and the positive supply rail 18 or ground, on the other hand. It comprises at least one switch 62 in series with at least one resistor 61.

More particularly, the controllable resistive load 60 comprises one or more resistors 61 adapted to ensure minimum electrical consumption in the relay R1. This minimum electric current is for example 500 mA under the nominal supply voltage of the network, which is typically equal to 12 V in the case of a motor vehicle, 24 V in the case of a heavy vehicle-type vehicle, or conversely 6 V in the case of a motorcycle.

The controllable resistive load 60 further comprises a switch 62, for example a bipolar transistor or a MOSFET transistor, arranged in series with the resistor(s). Depending on whether it is closed or open, this switch makes it possible to connect or disconnect, respectively, the resistor(s) 61 from the supply voltage between the +APC and the ground.

The switch 62 of the controllable resistive load 60 is controlled by a vehicle computer, for example the central passenger compartment computer VSM ("Vehicle Supervisor Module") or BSI ("Built-in Systems Interface") at PSA Automobiles SA, generally called BCM ("Body Control Module") by other car manufacturers. In some embodiments, the control law ensuring the control of the controllable resistive load can be coded in the application software of the VSM. The switch 62 is activated by a SW_CTRL signal, which is delivered, in the illustrated example, by the computer 30. Indeed, the control law for controlling the load 60 can advantageously be coded in the application software of the VSM computer.

The SW_CTRL signal can be an "All-or-Nothing" signal (or AON signal), of the "Low-Side" type (control active at ground) or of the "High-Side" type (control active at the positive supply voltage), depending on the type of switch 62, that is to say, depending on whether the switch 62 is of the "Low-Side" type or of the "High-Side" type, respectively. We will come back to these different variants later. As a further variant, the SW_CTRL signal can be a multiplexed signal, for example according to the multiplexed network protocol, such as LIN ("Local Interconnect Network"). LIN is a multiplexed network protocol used in the automotive industry in addition to the CAN bus, compared to which LIN is easier to use and less expensive in terms of resources.

Controlling the controlled resistive load 60 serves to ensure a minimum consumption, for example of 500 mA, on the +PERM when the relay R1 opens. This is obtained, in particular, by an appropriate choice of the value of the resistance of the controllable resistive load. This choice depends in particular on the level of equipment of the vehicle. The higher this level, the more electrical current consumers are in principle installed on board the vehicle (in particular for comfort equipment such as air conditioning, heated electric seats, etc.), which, on average, draw current from the +PERM power supply through the relay R1.

Once the principle of a controllable electric charge has been adopted as it has just been explained above, one implementation difficulty lies in knowing the moment when the +APC will be, or simply is likely to be, deactivated. This deactivation is caused by the opening of the relay R1, which is controlled by the return to zero of the IGNIT signal and by the corresponding deactivation of the control signal of the CTRL_+APC relay. In fact, it is necessary to activate the controlled resistive load 60 beforehand by activating the SW_CTRL signal, in order to ensure the minimum consumption of 500 mA when the relay R1 opens. However, the deactivation of the +APC occurs when the driver cuts the vehicle ignition, and this action cannot be predicted with certainty.

The proposal comprises controlling the controlled resistive load only when the speed of the vehicle is zero, or very close to 0, it being observed that the driver is liable to cut the ignition only under these conditions. In order to avoid control instability, it is advantageous to have a hysteresis. For example, the controlled load is activated if the speed of the vehicle is less than or equal to a first threshold Vth1 (for example, Vth1=0 km/h), while the controlled load is deactivated when the speed of the vehicle exceeds a second threshold Vth2 strictly greater than the first threshold Vth1 (for example Vth2=5 km/h).

The SPEEDO information relating to the speed of the vehicle can be supplied to the computer 30 by a sensor 50, as illustrated symbolically in FIGS. 2 and 3. Preferably, the SPEEDO information can be transmitted to the computer 30 by the computer ABS/ESP of the vehicle (not shown, within which said information is available) via a multiplexed network, such as the CAN bus, for example.

We will return later to the detailed description of the control of the resistive load 60 as a function of the SPEEDO signal, with reference to FIG. 4. First, various embodiments of the vehicle electrical architecture will now be explained.

In an embodiment in accordance with FIG. 2, the controllable resistive load 60 can be integrated into a box in the format of an "ISO" removable relay of the Ultra Micro, Micro, Mini or Power type. This box of the controllable resistive load 60 can be mounted in the electrical distribution (relay fuse) box 10, as shown in the figure.

The box of the controllable resistive load 60 has at least three connection pins for, respectively:
  its connection to +APC switched supply voltage;
  its connection to the ground rail 19, as in the example shown in FIG. 1, or to the positive supply rail 18; and
  receiving the command SW_CTRL for activating the resistive load from the computer 30, said activation command causing the switch 62 to close.

More particularly, the connection to the +APC switched supply voltage preferably takes place downstream of one of the fuses F1, F2 and F3 (considering the direction of the current circuit from the voltage source 100 to the current consumers 21, 22 and 23), so that the controlled resistive load benefits from the protection by this or these fuse(s).

In the illustrated example, the connection of the controllable resistive load box 60 is done at the wiring harness 20, outside the relay fuse box 10 (UDB), from an output 14 of said relay fuse box 10. This makes it possible to use, for the box of the controllable load 60, a slot on the printed circuit board of the UDB that is normally reserved for a relay box, the output 14 of the UDB being the output envisaged by the pattern of said printed circuit for the connection of a relay box that would be installed in this slot, to any consumer via the external wiring harness 20.

This embodiment has the advantage of not requiring any modification of the printed circuit of the UDB 10: no mechanical modification, nor modification of the routing of the printed circuit of the UDB, in particular because the installation of the removable "controllable resistive load" on a spare relay slot of the UDB and without impact on the routing of the printed circuit.

Those skilled in the art will appreciate that the box of the controllable resistive load 60 may have complementary pins, not electrically connected, which make it possible to improve its mechanical strength on the printed circuit of the relay fuse box, and which contribute to better heat dissipation by heat conduction via these additional pins.

In another embodiment shown in FIG. 3, the controllable resistive load 60 may be arranged outside the electrical distribution box 10, for example in the wiring harness 20.

The advantage of this solution is that it makes it possible to delocalize the effect of thermal rise due to the heating by Joule effect in the resistor 61 of the controllable resistive load 60. In particular, the heat thus generated no longer need to be eliminated from the relay fuse box 10, which is already, by nature, a site of substantial heating, and the cooling of which is already, in itself, a real problem. With the embodiment of FIG. 3, the heat generated by the flow of current in the controllable resistive load 60 when the switch 62 is closed is located elsewhere in the engine compartment (or even further away), and can thus be more easily evacuated.

With reference to FIG. 4a and to FIG. 4b, we will now describe two alternative arrangements of the controllable resistive load 60, corresponding to two respective types of assembly of the switch 62. In both cases, the controllable resistive load is connected between the +APC switched supply voltage and the ground.

In the case of FIG. 4a, which uses the example already shown in FIGS. 2 and 4, the assembly of the switch 62 is of the "Low-Side" type, i.e. the switch 62 can be arranged between the resistor 61 and the ground. When the switch 62 is a bipolar transistor, in this case it is an NPN-type transistor. If it is a MOSFET transistor, it is an NMOS-type transistor. This arrangement has the advantage that the SW_CTRL control signal can be a signal referenced to ground, which is easier to generate. If the switch is a PMOS transistor, which, as a MOSFET transistor, is voltage controlled, the SW_CTRL signal can drive its control gate directly. If it is a bipolar transistor, the current control of such a transistor requires a voltage bias, which requires an adaptation stage (or "driver"), but its implementation is simplified because the voltage to be applied on the base of the transistor is referenced with respect to the ground.

In the case of FIG. 4b, the assembly of the switch 62 is of the "High-Side" type, that is to say, it is arranged between the +APC switched supply voltage and the resistor 61. When the switch 62 is a bipolar transistor, in this case it is an PNP-type transistor. If it is a MOSFET transistor, it is a PMOS-type transistor. These two types of transistors are controlled by a signal referenced with respect to the +APC switched supply voltage. This assembly may be preferred to the assembly of FIG. 4a, for example when an available output of the computer 30, which is of the "High-Side" type, is used for the SW_CTRL control signal. In this case, in fact, the referencing of the SW_CTRL control signal as it is generated by the computer 30 is more suitable for driving the transistor that implements the switch 62 of the controllable resistive load 60.

Other embodiments, which will now be described, make it possible to provide additional advantages. For the sake of brevity, these embodiments are not illustrated in the drawings, but those skilled in the art will recognize one or more ways of implementing them based on their general knowledge.

In a first embodiment, the electrical architecture of the vehicle may comprise a temperature sensor arranged to sense the temperature at the controllable resistive load. It may for example be a bimetallic-type device, in series with the resistor(s) of the controllable resistive load. It can also be a component of the NTC type (for "Negative Temperature Coefficient") or of the PTC type (for "Positive Temperature Coefficient") associated with a device for measuring the impedance thereof. This measurement can be implemented in the computer 30.

The computer 30, which implements the control strategy of the controllable resistive load 60, can then advantageously be adapted to implement a thermal protection function in order to inhibit the closing command of the switch 62 when the temperature at the controllable resistive load 60 is greater than a determined threshold. If this is the case, then the SW_CTRL signal is forced to the low logic state, i.e. the controllable resistive load is deactivated. This thermal protection strategy makes it possible to disconnect the resistor(s) 61 if overheating is detected. This protects all the components of the architecture, and in particular the UDB.

In a second embodiment, the computer 30 can be adapted to implement a diagnostic function associated with the controllable resistive load 60.

For example, the output stage of the computer ensuring the control of the controllable resistive load can be associated with a voltage and/or current measurement allowing a disconnection to be detected of the box comprising the controllable resistive load 60. This disconnection is taken into account by the computer and can be signaled using any appropriate procedure as part of the vehicle diagnostic operations.

It should be noted that, in the case where thermal protection as described above is implemented, it is possible to ensure that the activation of the thermal protection triggers behavior of the input stage of the box equivalent to an open circuit, therefore equivalent to an absence of the box. Thus, information representative of the overheating situation can also be reported via the diagnostic function.

In the case of a control by a multiplexed network (LIN, for example), a more elaborate diagnosis can be implemented, allowing the following information to be fed back to the control computer:

the fact that the box of the controllable resistive load is absent from the electrical distribution box;
a rereading of the presence of the +APC supply voltage;
the fact that the thermal protection is activated (for the embodiments in which the thermal protection function described above is implemented);
temperature measurement within the controllable resistive load box, this information being able to extrapolate the ambient temperature of the fuse relay box in the phases where the controllable resistive load is not controlled.

In another embodiment, a current sensor can be added in series with relay R1 (+APC relay) in order to measure the current actually flowing in this relay.

The control strategy of the controlled resistive load can then be adapted as a function of this information. In such an embodiment, the controlled resistive load 60 may comprise a plurality of resistors arranged in parallel, having identical or different values, and each arranged in series with a respective switch, each switch being individually controlled by the computer. The SW_CTRL control signal can then be a multi-bit signal (carried by a wire harness respectively associated with each switch), each bit controlling a respective switch. As a function of this signal, all or part of the switches are closed, causing all or part of the resistors to be placed in parallel, and therefore causing the flow of an additional current, which is all the greater as the number of resistors thus activated is higher.

Such a control strategy based on the actual current in the +APC relay not only makes it possible to activate the controlled resistive load only when this current is actually below the defined threshold (for example, 500 mA) and the conductor is likely to cut the ignition, but also only to the extent necessary to supplement the current already existing in the relay by an additional current making it possible to reach the minimum current threshold of 500 mA considered in this example.

In another embodiment, instead of being carried out by a SW_CTRL signal in the form of an AON ("All or Nothing") signal, the control of the switch 62 of the controllable resistive load 60 can be controlled by a periodic pulse-width modulation (or PWM) signal.

Such a control of the resistive load 60 controlled by a PWM signal makes it possible to:

regulate the rms current to 500 mA according to the voltage of the on-board network, or
in the presence of the current sensor described above, limit the rms current flowing through the controlled load to a value such that the sum of the latter and of the current already consumed by the existing and activated consumers is greater than or equal to 500 mA.

Another embodiment aims to ensure that, in the event of an excessively high +APC supply voltage, beyond 16 V for example, the controlled resistive load 60 is deactivated.

It should be remembered that the electrical architecture of a vehicle can be voluntarily subjected to such exceptional voltages (such as 18 V or 24 V) during validation tests, in order to verify that the architecture withstands, for example, the connection in error of a truck battery with a nominal voltage of 24 V instead of a car battery with a nominal voltage of 12 V. Deactivating the controllable resistive load if a determined voltage threshold is exceeded makes it possible to optimize the power sizing of said load. Indeed, if it were to be able to withstand the application of a voltage of 24 V instead of the +APC of nominal value equal to 12 V, for example, it would have to be carried out by a more expensive component, which would also be larger.

In fact, circulating a current of 500 mA in the controlled load at a voltage greater than 16 V, for example, causes energy dissipation and therefore heating, which can prevent compliance with the safety specifications to which the architecture is subject.

In practice, the +APC voltage is supplied to the computer 30 via the electrical distribution (relay fuse) box 10 and its dedicated fuse F0. The computer is therefore able to compare the value of this voltage with a threshold, namely 16 V in the example considered here, which is greater than the values that the +APC can assume under normal operating conditions of the vehicle. If this is the case, then the SW_CTRL signal is forced to the low logic state by the computer 30, i.e. the controllable resistive load is deactivated. It is also said to have been shed. More particularly, the computer forces the deactivation of the controllable resistive load 60 by imposing the SW_CTRL signal on the low logic being as long as the +APC is greater than the 16 V threshold considered.

The voltage threshold taken into account is greater than the values that the +APC can normally assume, in particular when the alternator 110 recharges the battery 100. In such a case, the +APC voltage may slightly exceed 12 V and for example reach approximately 13.8 V, which is therefore not considered to be an exceptional value. Only a value greater than 16 V is considered an exceptional value in the example.

The load shedding of the controllable resistive load when exceptional voltages (18 V or 24 V, for example) are applied to the input 15 of the relay fuse box 10 (UDB) allows the power sizing of the resistive load and the thermal impact on the UDB to be limited. Thus, by load shedding for a voltage greater than 16 V, for example, the dissipated power can be reduced to 10.67 W instead of 24 W for an exceptional voltage withstand of 24 V. The power sizing is thus divided by more than 2 (reduction of more than 50%).

In order to avoid piloting instability, it is also preferable to have a hysteresis for activating the control of the load as a function of the value of the supply voltage. In one example, provision can be made for the controlled load to be deactivated if the +APC voltage becomes greater than 16 V, and for the controlled load to be reactivated if the +APC voltage drops back below 15.5 V. Those skilled in the art will appreciate that these values, as well as the difference between these values (which is 0.5 V in this example), are only non-limiting examples.

We now turn to FIG. 5 to describe the operation of the architecture according to the embodiments of FIGS. 2 and 3. More particularly, FIG. 5 shows two chronograms (A) and (B), which show the evolution, as a function of time t and for the same portion of time, of the CTRL_+APC signal for switching the +APC power supply and the SW_CTRL controllable resistive load control signal (in solid lines), respectively. Each chronogram also shows the evolution, as a function of time t and for the same portion of time, of the SPEEDO signal representative of the speed of the vehicle (in dotted lines). In the example considered here, which is in no way limiting but which has the advantage of simplicity, the SW_CTRL signal is a "low-side" type signal, in "All-or-Nothing" (AON), and is not pulse-width modulated. The CTRL_+APC signal is also a "low-side" and "All-or-Nothing" (AON) type signal.

It is assumed that at instant t1, the user actuates the "Start/Stop" button of the human-machine interface, or turns the key a first notch in the Neiman™ lock, or performs any similar action in order to "switch on the ignition." In response to this action, the computer 30 activates the CTRL_+APC signal, which changes from the low logic state to the high logic state, as shown by chronogram (A). Likewise, in response to this action, the computer 30 also activates the SW_CTRL signal, as shown by chronogram (B), in order to activate the controllable load 60. Indeed, it is possible that the user, in particular if he has acted in error, quickly cuts the vehicle's ignition without the vehicle even starting and picking up speed. The activation of the SW_CTRL signal guarantees that, in this hypothesis, a current of at least 500 mA will flow in the +APC relay (relay R1 of FIGS. 2 and 3) at the moment of this cutoff.

However, in the considered example, such a cutoff of the vehicle ignition does not occur immediately after the instant t1, and on the contrary the vehicle starts and picks up speed. The SPEEDO signal therefore grows quite quickly. When the SPEEDO signal exceeds a speed threshold Vth2 (for example Vth2=5 km/h), the SW_CTRL signal returns to the low logic state, since it is unlikely that the user will cut the ignition while the vehicle is in motion. This deactivates the controllable resistive load, reducing consumption and the production of heat by Joule effect.

At the instant t3, the vehicle having slowed down after having driven at a certain substantially constant cruising speed, the SPEEDO signal passes below a speed threshold Vth1, which makes it possible, if not probable, for the user to cut the ignition. In one example, the threshold Vth1 is equal to 0 km/h, which means, in fact, that the vehicle is stopped (i.e., it is no longer moving) at the instant t3. The SW_CTRL signal is reset to the high logic state by the computer 30, in order to activate the controllable load 60. However, the user does not cut the ignition, and on the contrary the vehicle picks up speed so that, at the instant t4, the SPEEDO signal passes back above the threshold Vth2. This can happen when the vehicle has had to stop at a traffic light, for example, but the journey is not finished and the driver does not cut the ignition of his vehicle. At this instant t4, the SW_CTRL signal returns to the low logic state, since it is again unlikely that the user will cut the ignition while the vehicle is moving, for the same reasons and with the same effects as at the instant t2.

At the instant t5, and after the vehicle has again driven at a certain substantially constant cruising speed, the SPEEDO signal passes back below the speed threshold Vth1. For the same reasons and with the same effects as at instant t3, at this instant t5 the SW_CTRL signal is reset to the high logic state by the computer 30, in order to activate the controllable load 60.

Thus, when, at the instant t6, the user cuts the vehicle's ignition, as illustrated by the fact that the CTRL_+APC signal goes to the low logic state on chronogram (A), a minimum current of 500 mA circulates in the relay, and makes it possible to clean the relay contact owing to the electric breaking arc of the electric circuit which then occurs at this contact.

As will be understood, the proposal consists in controlling the controlled resistive load only when the speed of the vehicle is zero, or very close to 0, it being observed that the driver is liable to cut the ignition only under these conditions. In order to avoid control instability, it is advantageous to have a hysteresis. For example, the controlled load is activated if the speed of the vehicle is less than or equal to a first threshold Vth1 (for example, Vth1=0 km/h), while the controlled load is deactivated when the speed of the vehicle exceeds a second threshold Vth2 strictly greater than the first threshold Vth1 (for example Vth2=5 km/h).

This makes it possible to limit the supply time of the resistive load, and consequently the heat dissipation, the electrical consumption and the $CO_2$ emissions during the driving time while ensuring consumption on the +APC switched supply voltage at the time of the opening of the +APC relay. The thermal impact on the UDB and the impact in terms of electrical consumption and $CO_2$ emissions are therefore limited due to control only in the phases where the driver is likely to cut the ignition.

The present invention has been described and illustrated in the present detailed description and in the figures of the accompanying drawings, in possible embodiments. The present invention is not, however, limited to the embodiments presented. Other alternatives and embodiments can be deduced and implemented by a person skilled in the art on reading the present description and the accompanying drawings.

In particular, those skilled in the art will appreciate that, while the detailed description relates to the problem of the +APC switched power supply, the proposed principle can be generalized to any power supply switched by a relay or the like.

In this disclosure, the term "comprising" or "including" does not exclude other elements or other steps. A single processor or several other units can be used to implement the invention. The different features which are presented can be advantageously combined. Their presence in different parts does not exclude this possibility. The reference signs cannot be understood as limiting the scope of the invention.

The invention claimed is:

1. An electrical architecture of a motor vehicle, comprising: —an electrical ground and at least one DC voltage source delivering a supply voltage;
at least one current-consuming device;
an electrical distribution box with at least one supply rail coupled to an input of the box to receive the supply voltage and a ground rail coupled to a ground, at least one output terminal, and at least one relay arranged in series between the supply rail and the output terminal of the box and adapted to switch the supply voltage to the output terminal; —a wiring harness, arranged between the output terminal of the electrical distribution box and the at least one current consuming device in order to supply said at least one current consuming device electrically with the switched supply voltage; and—at least one computer, wherein, said electrical architecture further comprises a controllable resistive load electrically connected in parallel between the output of the electrical distribution box, and the positive supply rail or the ground, said controllable resistive load comprising at least one switch in series with at least one resistor, said switch being adapted to be controlled by the at least one computer that is adapted to cause the at least one switch to close for a vehicle speed below a first determined speed threshold, making it possible to ensure current consumption in the at least one relay under the supply voltage that is greater than a determined current threshold, and to cause the at least one switch to open for a vehicle speed greater than a second determined speed threshold higher than said first speed threshold.

2. The electrical architecture according to claim 1, wherein the controllable resistive load is arranged in a removable relay box, for example a box having an "Ultra-micro," "Micro," "Mini" or "Power" relay type format, which is suitable for being installed in the electrical distribution box.

3. The electrical distribution box according to claim 1, wherein the controllable resistive load is arranged outside the electrical distribution box, for example in the wiring harness.

4. The electrical architecture according to claim 1, further comprising a temperature sensor arranged to sense the temperature at the controllable resistive load, and wherein the at least one computer is adapted to implement a thermal protection function in order to inhibit a switch closing command when the temperature at the controllable resistive load is greater than a determined threshold.

5. The electrical architecture according to claim 1, wherein the computer is adapted to implement a diagnostic function associated with the controllable resistive load.

6. The electrical architecture according to claim 1, further comprising a current sensor in series with the at least one relay of the electrical distribution box and adapted to produce information relative to the current actually flowing in said at least one relay of the electrical distribution box, and wherein the strategy for controlling the controlled resistive load is a function of said information.

7. The electrical architecture according to claim 1, wherein control of the at least one switch of the controllable resistive load is controlled by a periodic pulse-width modulated signal.

8. The electrical architecture according to claim 1, wherein the at least one computer is adapted to compare a value of the switched supply voltage with a determined threshold, for example 16 V, and to force the deactivation of the controllable resistive load if said threshold is exceeded.

9. A method of using an architecture according to claim 1, wherein the controllable resistive load is activated and is adapted to ensure the circulation of a minimum electric current in the relay, for example a current equal to approximately 500 mA, when the speed of the vehicle is less than or equal to a first speed threshold, for example equal to approximately 0 km/h, and wherein the controllable resistive load is deactivated when the speed of the vehicle is greater than a second speed threshold, strictly greater than the first speed threshold, and for example equal to approximately 5 km/h.

10. A motor vehicle comprising the electrical architecture according to claim 1.

* * * * *